United States Patent
James et al.

(10) Patent No.: US 6,557,067 B1
(45) Date of Patent: Apr. 29, 2003

(54) SYSTEM AND METHOD TO EFFECTIVELY COMPENSATE FOR DELAYS IN AN ELECTRONIC INTERCONNECT

(75) Inventors: David V. James, Palo Alto, CA (US); Scott D. Smyers, San Jose, CA (US); Glen D. Stone, Los Gatos, CA (US); Bruce A. Fairman, Woodside, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/497,322

(22) Filed: Feb. 3, 2000

(51) Int. Cl.[7] .................. G06F 13/36; G06F 13/14; G06F 15/16; G06F 1/12; G06F 13/42
(52) U.S. Cl. .................. 710/306; 710/305; 710/311; 709/230; 709/231; 709/232; 709/233; 709/234; 713/400; 713/401
(58) Field of Search .................. 709/230, 231, 709/232, 233, 234; 713/400, 401; 710/305–315

(56) References Cited

U.S. PATENT DOCUMENTS

| | | | | |
|---|---|---|---|---|
| 5,941,951 A | * | 8/1999 | Day et al. | 709/233 |
| 6,119,243 A | | 9/2000 | Garney et al. | 713/600 |
| 6,199,136 B1 | | 3/2001 | Shteyn | 710/129 |

* cited by examiner

Primary Examiner—Mark H. Rinehart
Assistant Examiner—Trisha Vu
(74) Attorney, Agent, or Firm—Gregory J. Koerner; Simon & Koerner LLP (57) ABSTRACT

A system and method to effectively compensate for delays in an electronic interconnect comprises a controller that initially schedules a first transmission from a first talker device to several listener devices. The controller then schedules a second talker device to pre-roll a second transmission and selectively routes the second transmission to compensate for delays introduced by components of said electronic interconnect to thereby provide a seamless transmission stream to the several listeners.

43 Claims, 7 Drawing Sheets

BRIDGE
116

FIG. 7

SYSTEM AND METHOD TO EFFECTIVELY COMPENSATE FOR DELAYS IN AN ELECTRONIC INTERCONNECT

BACKGROUND OF THE INVENTION

1. Field of the Invention

This invention relates generally to techniques for performing data transfer operations, and relates more particularly to a system and method to effectively compensate for delays in an electronic interconnect.

2. Description of the Background Art

Implementing effective methods for transferring data in an electronic interconnect is a significant consideration for designers and manufacturers of contemporary electronic devices. An electronic device in an electronic interconnect may advantageously communicate with other electronic devices in the interconnect to share data, and thereby substantially increase the capabilities and versatility of individual devices in the electronic interconnect. For example, an electronic interconnect may be implemented in a home environment to enable flexible and beneficial sharing of data between various consumer electronic devices, such as personal computers, digital video disc (DVD) devices, digital set-top boxes for digital broadcasting, enhanced television sets, and audio reproduction systems.

Effectively managing data transfer operations in an interconnect of electronic devices may create substantial challenges for designers of electronic interconnects. For example, enhanced demands for increased device functionality and performance during data transfer operations may require more system processing power and require additional hardware resources across the interconnect. An increase in processing or hardware requirements may also result in a corresponding detrimental economic impact due to increased production costs and operational inefficiencies.

Interconnect size is also a factor that affects the management of data transfer operations in an electronic interconnect. Communications in an electronic interconnect typically become more complex as the number of individual devices or nodes increases. Assume that a particular device on an electronic interconnect is defined as a local device with local software elements, and other devices on the electronic interconnect are defined as remote devices with remote software elements. Accordingly, a local software module on the local device may need to transfer data to various remote software elements on remote devices across the electronic interconnect. However, successfully managing a substantial number of electronic devices across an interconnect may provide significant benefits to a system user.

Furthermore, enhanced device capability to perform various advanced data transfer operations may provide additional benefits to a system user, but may also place increased demands on the control and management of the various devices in the electronic interconnect. For example, an enhanced electronic interconnect that effectively accesses, processes, and displays digital television programming may benefit from efficient interconnect communication techniques because of the large amount and complexity of the digital data involved.

One type of data transfer that may occur in an electronic interconnect is an isochronous data transfer. Isochronous data transfers include the guaranteed handling of data that arrives in a time-based stream at regular intervals called cycles. Isochronous data transfers are typically used for time-sensitive applications. For example, video or audio data being transmitted across an interconnect typically needs to arrive at a display device in an uninterrupted flow with appropriate timing. Because of the need for predictable and deterministic behavior when transferring isochronous data, propagation delay becomes a significant factor, especially when dealing with multiple sources for generating isochronous data.

Due to growing demands on system resources and substantially increasing data magnitudes, it is apparent that developing new and effective methods for transferring data is a matter of importance for the related electronic technologies. Therefore, for all the foregoing reasons, implementing effective methods for transferring data remains a significant consideration for designers, manufacturers, and users of contemporary electronic devices.

SUMMARY OF THE INVENTION

In accordance with the present invention, a system and method are disclosed to effectively compensate for delays in an electronic interconnect. In one embodiment of the present invention, a bus A is coupled to a bus B through a bus bridge which adds a certain propagation delay to any transmissions coupled from bus A to bus B through the bus bridge. In this embodiment, a talker A and a listener A are connected to bus A. Similarly, a talker B and a listener B are connected to bus B.

In one embodiment, initially, a controller preferably utilizes a connection manager to set up connections and obtain delay information for a particular isochronous data transmission that includes a transition from talker A to talker B. The controller then preferably uses a listener module to enable listener A and listener B to receive the data transmission.

The controller next preferably utilizes a talker module to schedule a transmission A from talker A. In response, talker A begins transmission A at the scheduled start time. Then, the talker module preferably utilizes the delay information previously obtained by the connection manager to determine a "pre-roll" start time for talker B to begin transmitting a transmission B to bus A through the bus bridge.

The talker module then preferably schedules talker B to begin transmitting transmission B at the "pre-roll" start time. In response, talker B begins sending transmission B to bus A through the bus bridge at the scheduled start time. The talker module then preferably schedules a stop time for talker A to stop broadcasting transmission A.

Finally, precisely at a designated rebroadcast time, the bus bridge preferably begins to rebroadcast transmission B received from talker B. Also at the rebroadcast time, talker A preferably stops broadcasting transmission A to successfully complete a seamless and synchronized transition from transmission A of talker A to transmission B of talker B.

In alternate embodiments, the present invention may be successfully implemented with method steps that follow an altered sequence, or include steps that are different from, or in addition to, those discussed in conjunction with the above embodiment. In general, the present invention preferably compensates for delay by providing the appearance that all talkers are located at the same logical point in the electronic interconnect. For example, during a transition to a second talker on a different bus, the transmission from the second talker may preferably be transmitted through the intervening bus bridge to the original bus of the original talker, and then rebroadcast as though the transmission were actually coming from the original talker.

The original talker may thus serve as a timing reference to synchronize the various transmissions, and thus compensate for any delays. All subsequent talkers then preferably may send their transmissions towards the original reference bus with the appropriate lead time, so that the respective transmissions arrive at the original bus at the correct instant to perform a precise switch between the successive talkers. The present invention therefore effectively and efficiently compensates for delays in an electronic interconnect.

DETAILED DESCRIPTION OF THE PREFERRED EMBODIMENT

The present invention relates to an improvement in electronic interconnects. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method to effectively compensate for delays in an electronic interconnect, and includes a controller that initially schedules a first transmission from a first talker device to several listener devices. The controller then schedules a second talker device to pre-roll a second transmission, and selectively routes the second transmission to compensate for delays introduced by said electronic interconnect to thereby provide a seamless transmission stream to the several listeners.

Figure 1:
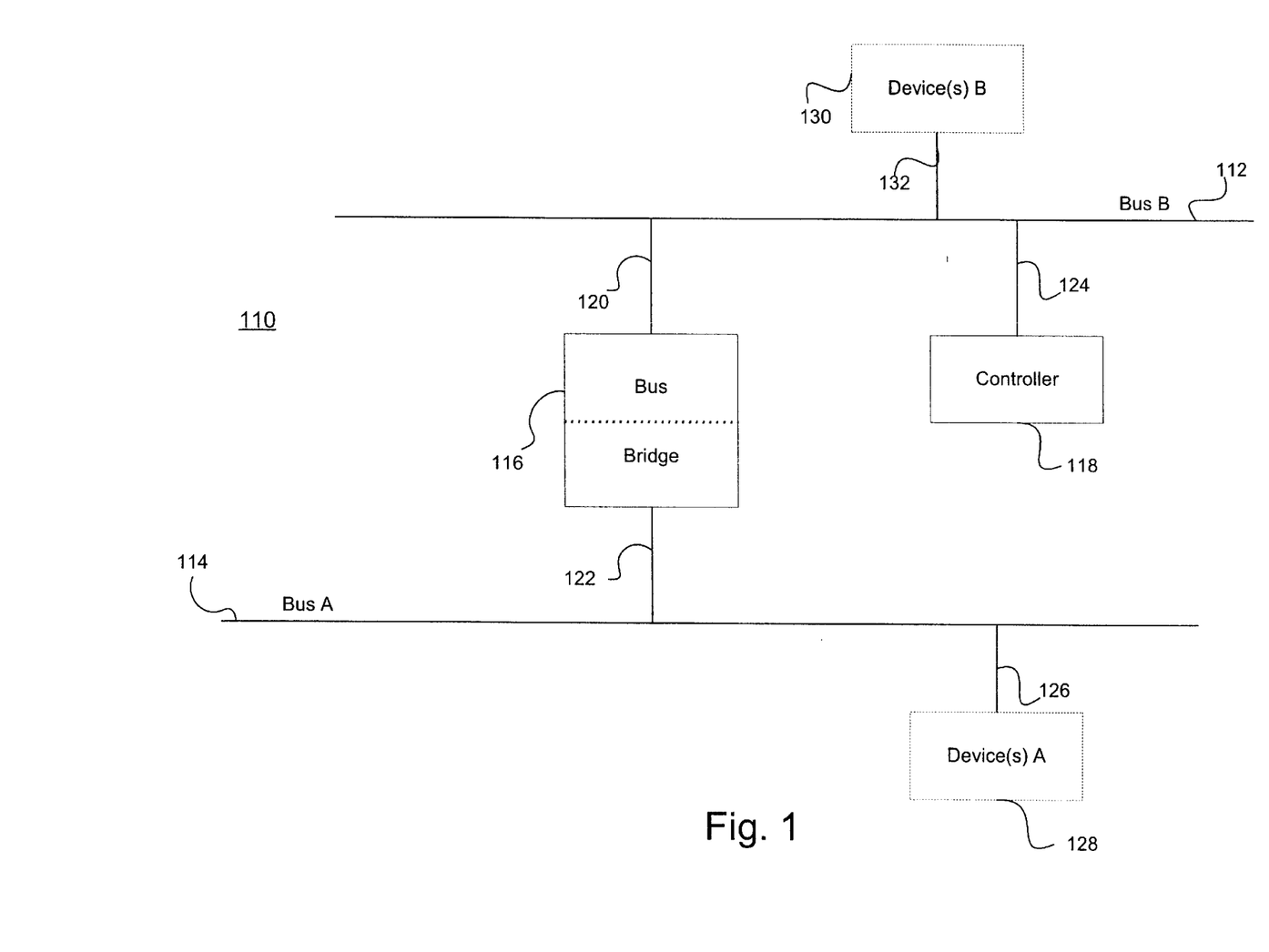
FIG. 1 is a diagram for one embodiment of an electronic interconnect with multiple busses, in accordance with the present invention.

Referring now to FIG. 1, a diagram for one embodiment of an electronic interconnect 110 with multiple busses (bus A 114 and bus B 112) is shown, in accordance with the present invention. In the FIG. 1 embodiment, interconnect 110 preferably comprises, but is not limited to, a bus A 114, device(s) A 128, a bus B 112, device(s) B 130, a controller 118, and a bus bridge 116. In alternate embodiments, interconnect 110 may readily be configured to include various other devices or components that function in addition to, or instead of, those discussed in conjunction with the FIG. 1 embodiment. Similarly, in alternate embodiments, interconnect 110 may readily be connected and configured in any other appropriate and suitable manner.

In the FIG. 1 embodiment, each of device(s) A (128) and device(s) B 130 of interconnect 110 may be implemented as any type of electronic device, including, but not limited to, personal computers, printers, digital video disc devices, television sets, audio systems, video cassette recorders, memory devices, and various consumer electronics devices. In addition, in the FIG. 1 embodiment, interconnect 110 is preferably implemented in accordance with an IEEE Std 1394-1995 Standard for a High Performance Serial Bus, which is hereby incorporated by reference. However, in alternate embodiments, interconnect 110 may readily communicate and function using various other interconnect methodologies which are equally within the scope of the present invention.

In the FIG. 1 embodiment, controller 118 preferably may coordinate and control communications between device(s) A 128 on bus A 114 and device(s) B 130 on bus B 112 via bus bridge 116. In certain embodiments, controller 118 may be implemented as a set-top box device. One implementation of controller 118 is further discussed below in conjunction with FIG. 2. Furthermore, the functionality and utilization of bus bridge 116 is further discussed below in conjunction with FIGS. 4 through 7 Referring now to FIG. 2, a block diagram for one embodiment of the FIG. 1 controller 118 is shown, in accordance with the present invention. Controller 118 preferably includes, but is not limited to, a processor 212, an input/output (I/O) interface 214, a memory 216, and a device bus 226. Processor 212, I/O interface 214, and memory 216 preferably are each coupled to, and communicate via common device bus 226.

Figure 2:
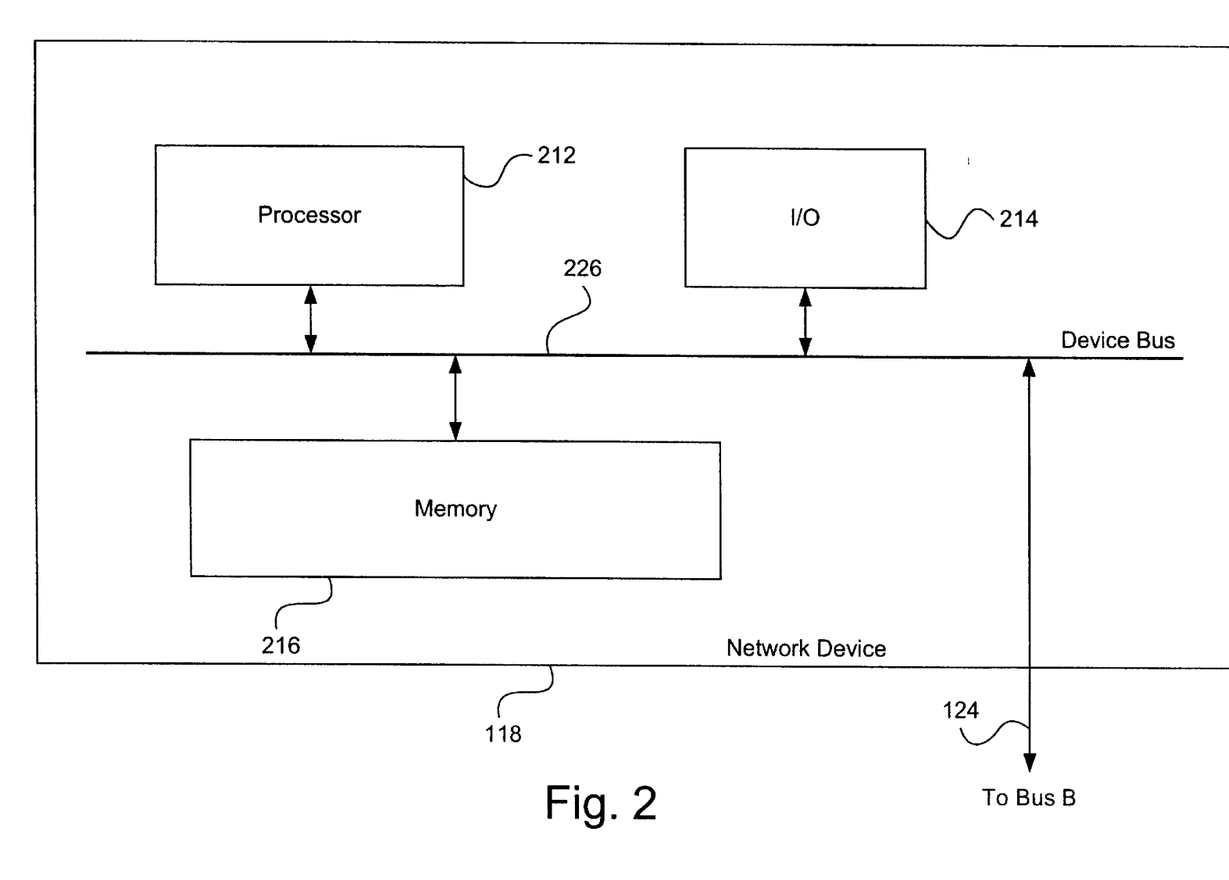
FIG. 2 is a block diagram for one embodiment of the controller of FIG. 1, in accordance with the present invention.

In the FIG. 2 embodiment, processor 212 may be implemented as any appropriate multipurpose microprocessor device. Memory 216 may be implemented as one or more appropriate storage devices, including, but not limited to, read-only memory, random-access memory, and various types of non-volatile memory, such as floppy disc devices or hard disc devices. I/O interface 214 preferably may provide an interface for communications with various compatible sources and/or destinations, include a user of interconnect 110. The functionality and utilization of controller 118 is further discussed below in conjunction with FIGS. 5 through 7.

Figure 3:
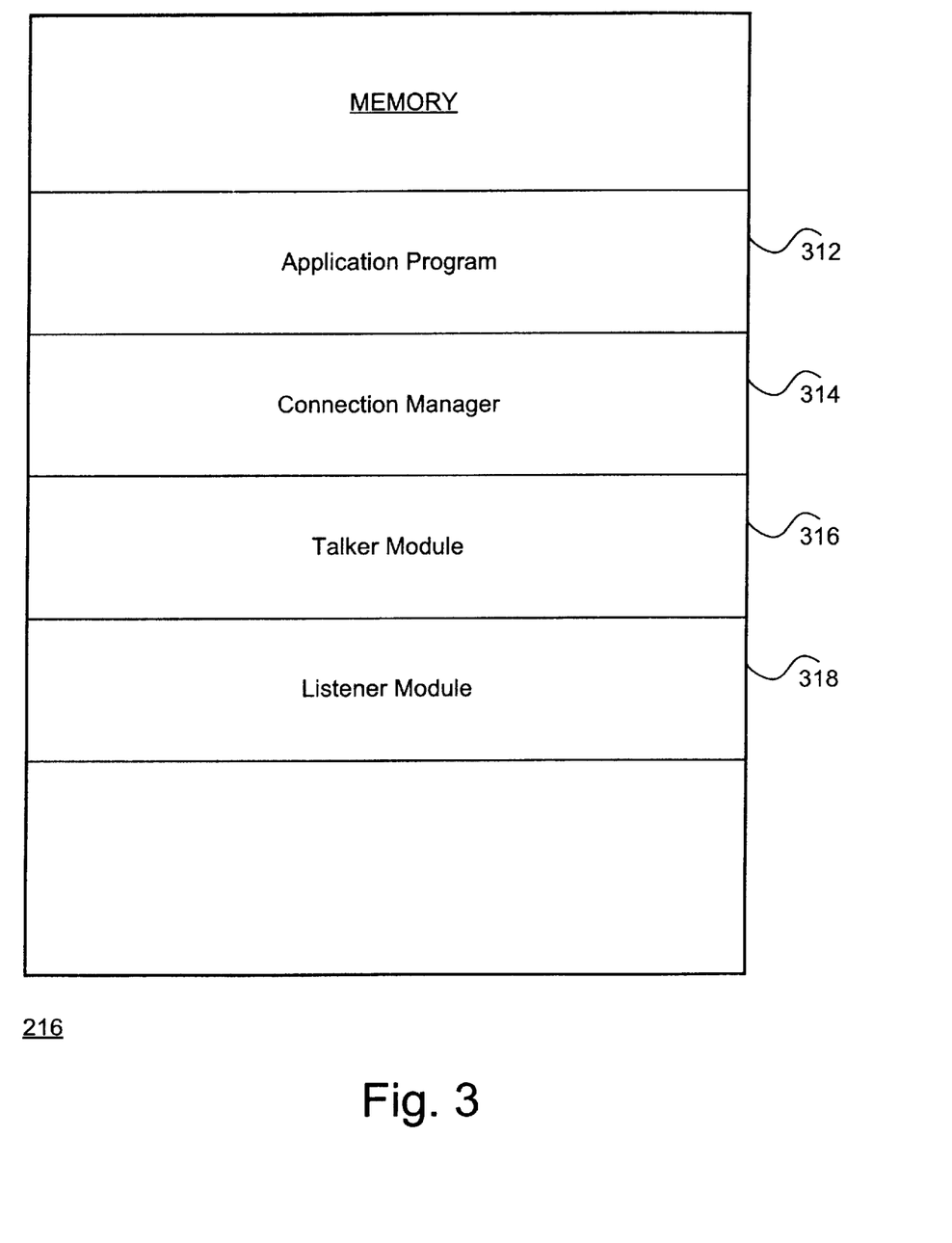
FIG. 3 is a diagram for one embodiment of the memory of FIG. 2, in accordance with the present invention.

Referring now to FIG. 3, a diagram for one embodiment of the FIG. 2 memory 216 is shown, in accordance with the present invention. In the FIG. 3 embodiment, memory 216 preferably includes, but is not limited to, an application program 312, a connection manager 314, a talker module 316, and a listener module 318. In alternate embodiments, memory 216 may readily include various other components in addition to, or instead of, the components that are discussed in conjunction with the FIG. 3 embodiment.

In the FIG. 3 embodiment, application program 312 includes software instructions that are preferably executed by processor 212 for performing various functions and operations by controller 118. The particular nature and functionality of application program 312 preferably varies depending upon factors such as the configuration and implementation of electronic interconnect 110.

In accordance with the present invention, controller 118 preferably utilizes connection manager 314, talker module 316, and listener module 318 to advantageously control communications on interconnect 110. The functionality and use of connection manager 314, talker module 316, and listener module 318 are further discussed below in conjunction with FIGS. 4 through 7.

Figure 4:
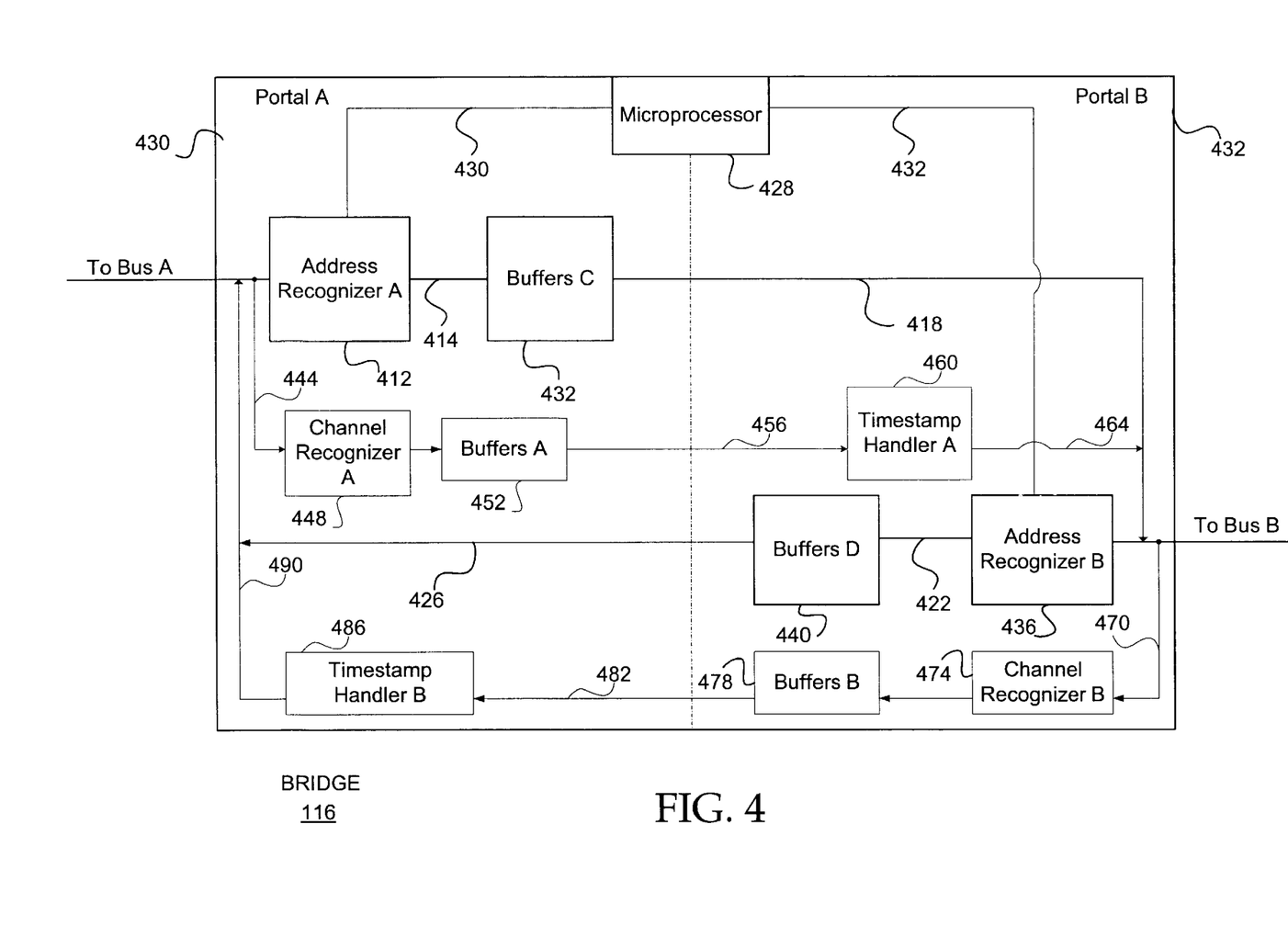
FIG. 4 is a block diagram for one embodiment of the bus bridge of FIG. 1, in accordance with the present invention.

Referring now to FIG. 4, a block diagram for one embodiment of the FIG. 1 bus bridge 116 is shown, in accordance with the present invention. In the FIG. 4 embodiment, bridge 116 preferably includes, but is not limited to, a microprocessor 428, an address recognizer A 412, buffers C 432, an address recognizer B 436, and buffers D 440.

In the FIG. 4 embodiment, bridge 116 preferably also may include a channel recognizer A 448, buffers A 452, a timestamp handler A 460, a channel recognizer B 474, buffers B 478, and a timestamp handler B 486. In alternate embodiments, bridge 116 may readily be configured to include various other components that function in addition to, or instead of, those discussed in conjunction with the FIG. 4 embodiment. Similarly, in alternate embodiments, components of bridge 116 may be connected in any other appropriate and effective manner.

In the FIG. 4 embodiment, bridge 116 preferably monitors transmissions on bridged busses, and then selectively forwards the transmissions to an adjacent bus whenever at least one listener for the transmissions exists downstream from the adjacent bus. In practice, in the case of isochronous data packets, channel recognizer A 448 analyzes the isochronous data packets on bus A 114, and responsively determines whether the data packets are directed to the adjacent bus (here, bus B 112). If the foregoing packets are intended for bus B 112, then channel recognizer A 448 temporarily stores the packets into buffers A 452.

In the FIG. 4 embodiment, buffers A 452 preferably store isochronous packets received from channel recognizer A 448 for a period of "N" isochronous cycles to ensure synchronization with other isochronous processes. Buffers A 452 then preferably transmit the stored packets to timestamp handler A 460 via path 456 which then preferably transmits the data packets to bus B 112 via path 464. Bridge 116 therefore creates a propagation delay in transmissions from bus A 114 to bus B 112.

For transmissions in the reverse direction a similar process occurs in which channel recognizer B 474 analyzes packets on bus B 112, and responsively decides whether to forward the packets to the adjacent bus (here, bus A 114). If the forgoing packets are intended for bus A 114, then channel recognizer B 474 temporarily stores the packets into buffers B 478. Timestamp handler B 486 may subsequently transmit the packets into bus A 114 via path 490. The functionality and operation of bus bridges is further discussed in "Cumulative Submission To The P1394.1 Committee," by Dr. David V. James, Oct. 12. 1999, IEEE, which is hereby incorporated by reference.

Figure 5:
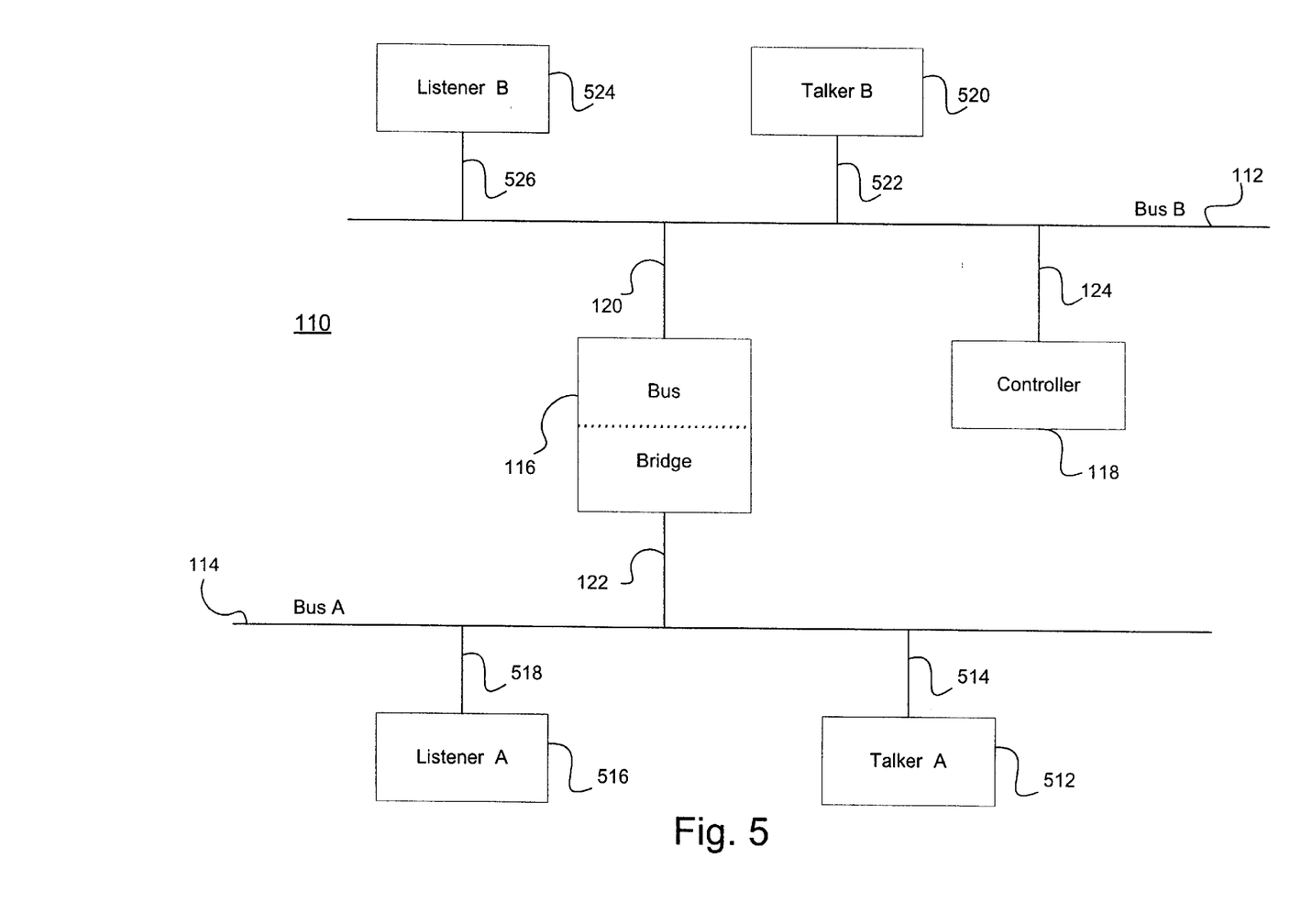
FIG. 5 is a diagram for one embodiment of an electronic interconnect with multiple talkers and multiple listeners, in accordance with the present invention.

Referring now to FIG. 5, a diagram for one embodiment of an electronic interconnect 110 with multiple talkers (talker A 512 and talker B 520) and multiple listeners (listener A 516 and listener B 524) is shown, in accordance with the present invention. The FIG. 5 embodiment is functionally and structurally similar to the FIG. 1 embodiment discussed above. However, in the FIG. 5 embodiment, listener A 516 and talker A 512 are substituted for device(s) A 128 of FIG. 1, and listener B 524 and talker B 520 are substituted for device(s) B 130 of FIG. 1. The foregoing discussion of FIG. 1 is therefore incorporated by reference into the present discussion of the FIG. 5 embodiment.

Furthermore, in alternate embodiments, the FIG. 5 interconnect 110 may readily be configured to include various other devices or components that function in addition to, or instead of, those discussed in conjunction with the FIG. 5 embodiment. Similarly, in alternate embodiments, interconnect 110 may readily be connected and configured in any other appropriate and suitable manner. For example, interconnect 110 may be implemented with various busses, talkers, and/or listeners in addition to, or instead of, those discussed in conjunction with the FIG. 5 embodiment.

The present invention comprises a technique for seamlessly transitioning from one talker to another talker over multiple busses. A talker preferably includes any source device or node that is coupled to interconnect 110 to broadcast a transmission of information to one or more listeners on interconnect 110. A listener preferably includes any destination device or node that is coupled to interconnect 110 to receive a transmission of information from one or more talkers. In certain embodiments, the transmission of information preferably includes packets of isochronous data.

However, in interconnects with multiple busses, bus bridges are typically required to facilitate communication between the various busses. As discussed above in conjunction with FIG. 4, bus bridges typically create delay or timing error in transmissions that are propagated from one bus to an adjacent bus. Depending upon the particular topology of a given interconnect, the foregoing delay or timing error may create discontinuity in a data stream of isochronous data when the data stream originates from several talkers or sources, and one talker switches to a different talker.

Such discontinuity during a transmission is not acceptable under isochronous performance requirements and standards. The present invention is also contemplated for effective use to compensate for sources of timing error other than those caused by bus bridges, and may therefore advantageously be utilized to compensate for various timing errors in any interconnect configuration.

The present invention preferably compensates for delay by providing the appearance that all talkers are located at the same logical point in the electronic interconnect. For example, during a transition to a second talker on a different bus, the transmission from the second talker may preferably be transmitted through the intervening bus bridge to the original bus of the original talker, and then rebroadcast as though the transmission were actually coming from the original talker. The original talker may thus serve as a timing reference to synchronize the various transmissions, and thus compensate for any delays. All subsequent talkers then preferably may send their transmissions towards the original reference bus with the appropriate lead time, so that the respective transmissions arrive at the original bus at the correct instant to perform a precise switch between the successive talkers.

The FIG. 5 embodiment will now be utilized to present an example of one application of the present invention. Any actual embodiment of the present invention is substantially dependent upon the topology and implementation of interconnect 110, and therefore the following example is presented only to discuss and illustrate various principles of the present invention.

In this FIG. 5 example, assume that controller 118 is a set-top box, talker A 512 is a memory device, talker B 520 is a memory device, listener A 516 is a display device, and listener B 524 is a display device. Also assume that talker A 512 stores a first portion of a video program for display on listener A 516 and listener B 524, and that talker B 520 stores a second portion of the video program for uninterrupted display on listener A 516 and listener B 524.

In accordance with the present invention, connection manager 314 of controller 118 preferably initially communicates with the various devices on interconnect 110 to set-up the uninterrupted and continuous playback of the stored video program. Controller 118 may preferably coordinate the assignment of necessary channels for the connection with bus bridge 116. Controller 118 preferably may also obtain delay information relevant to the connection.

In the FIG. 5 example, a listener module 318 of controller 118 preferably may then enable listener A 516 and listener B 524 to receive the video program transmission. A talker module 316 of controller 118 may next communicate with talker A 512 to precisely schedule a start time of the transmission. At the scheduled start time, talker A 512 preferably broadcasts a transmission A to listener A 516 on bus A 114, and also simultaneously broadcasts the transmission A to listener B 524 on bus B 112 through bus bridge 116. Because of the delay introduced by bus bridge 116, listener B 524 displays the video program at a slightly later time than listener A 516.

In preparation for the forthcoming transition from talker A 512 to talker B 520, talker module 316 preferably utilizes the delay information obtained by connection manager 314 to determine a start time for talker B 520 to begin transmitting a transmission B to bus A 114 through bus bridge 116. Because the transmission B travels through bus bridge 116 before being rebroadcast, a delay "D" will be introduced to transmission B prior to rebroadcast. In order to ensure that the transition between transmission A and transmission B is synchronized and seamless, talker module 316 therefore preferably schedules talker B 520 to begin sending transmission B to bus bridge 116 precisely at a "preroll" start time that is a period "D" before the actual transition time from transmission A to transmission B.

Therefore, while talker A 512 is still providing transmission A to listener A 516 and listener B 524, talker B begins to send transmission B towards bus bridge 116 via a back channel across connection 522, bus B 112, and connection 120. Talker module 316 then preferably schedules a stop time for talker A 512 to terminate transmission A.

Referring again to FIG. 4, channel recognizer B 474 preferably then stores the transmission B from talker B 520 into buffers B 478 via path 474. In accordance with the present invention, following a delay time that is preferably equal to the preroll period "D", bus bridge 116 preferably rebroadcasts transmission B at a precise rebroadcast time via path 482, timestamp handler B 486, path 490. In the FIG. 4 example, talker A 512 may simultaneously stop broadcasting transmission A. Channel recognizer A 448 may then store the rebroadcast transmission B into buffers A 452, and then subsequently transmit rebroadcast transmission B to bus B 112 via path 456, timestamp handler A 460, and path 464.

Referring again to FIG. 5, listener B 524 may then seamlessly receive transmission B via connection 526 without any discontinuity between transmission A and transmission B. In addition, listener A 516 may similarly receive transmission B via connection 518 with a seamless transition between transmission A and transmission B. Interconnect 110 has thus advantageously performed a transmission turnaround in bus bridge 116 to rebroadcast transmission B in a manner that provides a seamless data stream from a plurality of talkers over multiple busses to several listeners.

In certain alternate embodiments, it may sometimes not be appropriate or possible to directly utilize bus bridge 116 for performing the rebroadcast of transmission B. In such instances, any other appropriate device or node may readily be utilized for rebroadcasting transmission B to thereby provide a seamless data stream to the respective listeners, in accordance with the present invention. For example, in one embodiment, talker A 512 or any other capable transmission device may advantageously initiate a rebroadcast of the transmission B that was received through bus bridge 116. In addition, talker A 512 may simultaneously terminate the broadcast of transmission A to generate a seamless data stream.

The FIG. 5 example is presented in the context of two busses that are connected by a single bus bridge, where each bus includes a single talker and a single listener. However, the present invention is contemplated for use in interconnects comprising any desired number of busses, talkers, and/or listeners that are configured in any desired manner. In the case of an interconnect that includes more than two busses and a single bus bridge, controller 118 preferably may determine a delay "D" based on the total of all delays in the backchannel from a subsequent talker to the original talker. In addition, controller 118 may repeat the techniques discussed above in conjunction with FIG. 5 to optimize transitions in situations where more than two talkers are present.

Figure 6:
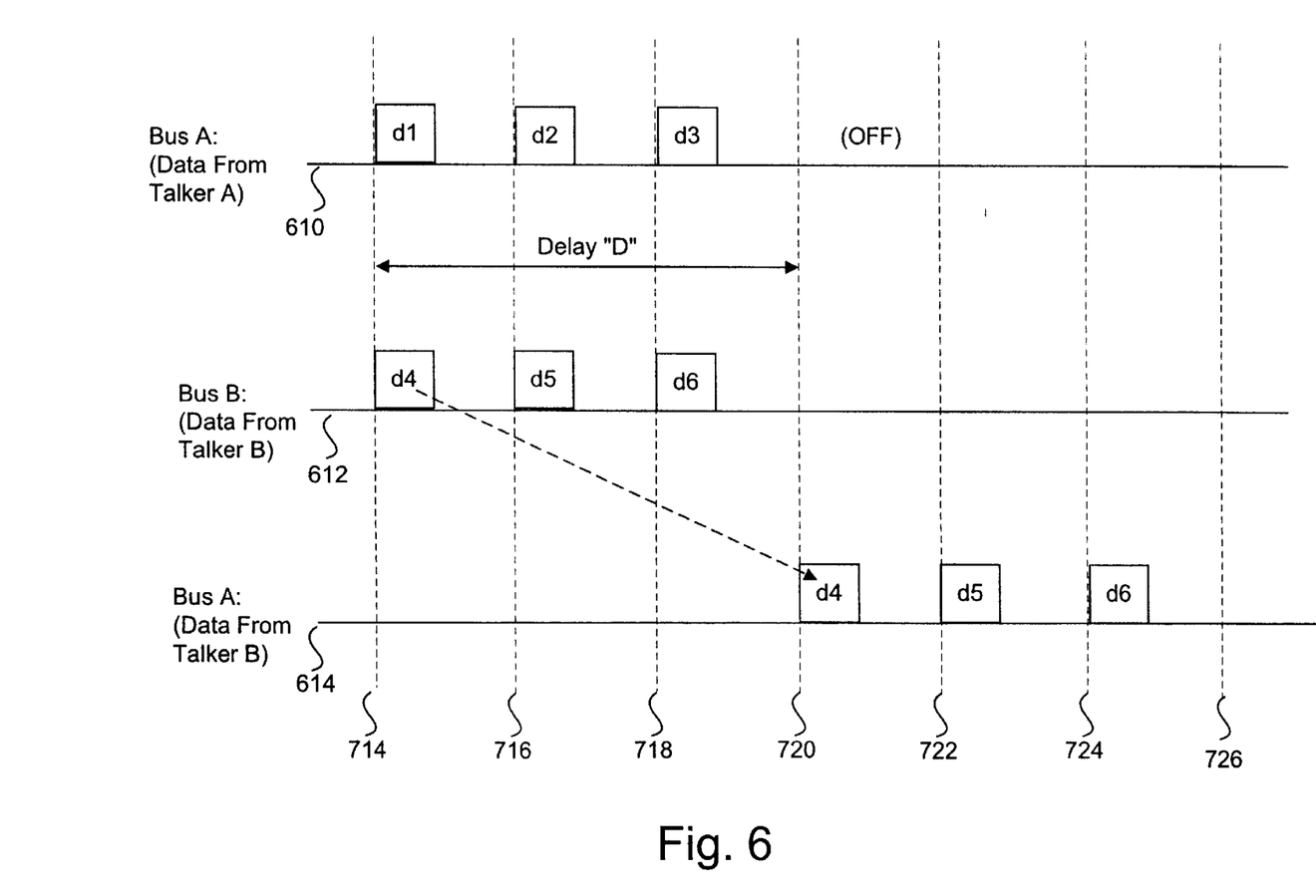
FIG. 6 is a timing diagram illustrating a transition from a talker A to a talker B, in accordance with one embodiment of the present invention.

Referring now to FIG. 6, a timing diagram illustrating a transition from a talker A 512 to a talker B 520 is shown, in accordance with one embodiment of the present invention. The timing diagram of FIG. 6 is presented for purposes of illustrating certain principles of the present invention. In alternate embodiments, the present invention may readily function with various waveforms and timing diagrams other than those discussed in conjunction with the FIG. 6 embodiment.

In the FIG. 6 embodiment, a waveform 610 from bus A 114 is shown depicting transmission A data from talker A 512. A waveform 612 from bus B 114 is also shown depicting transmission B data from talker B 520. In addition, a waveform 614 from bus A 114 is shown depicting rebroadcast transmission B data from talker B 520. The FIG. 6 waveforms include segments of isochronous data (d1 through d6) that are preferably transmitted during isochronous cycles which are delineated by times 714 through 726.

In waveform 610 corresponding to transmission A on bus A 114, isochronous data segments (d1 through d3) are transmitted at the rate of one data segment per isochronous cycle, beginning at time 714, until talker A 512 stops transmission A at time 720. In waveform 612 corresponding to transmission B on bus B 112, isochronous data segments (d4 through d6) are "prerolled" or started at the rate of one data segment per isochronous cycle, beginning at time 714, and transmission B is then directed towards bus bridge 116 which has a delay equal to delay "D" shown from time 714 to time 720.

In waveform 614 corresponding to rebroadcast transmission B originating on bus A 114, isochronous data segments (d4 through d6) are rebroadcast at the rate of one segment per isochronous cycle, beginning at rebroadcast time 720. Note that, at rebroadcast time 720, after being slowed by the delay "D" of bus bridge 116, the initial data segment d4 of "pre-rolled" transmission B at time 714 (waveform 612) now aligns precisely with rebroadcast time 720, and has become the initial data segment d4 of the rebroadcast transmission B (waveform 614).

Figure 7:
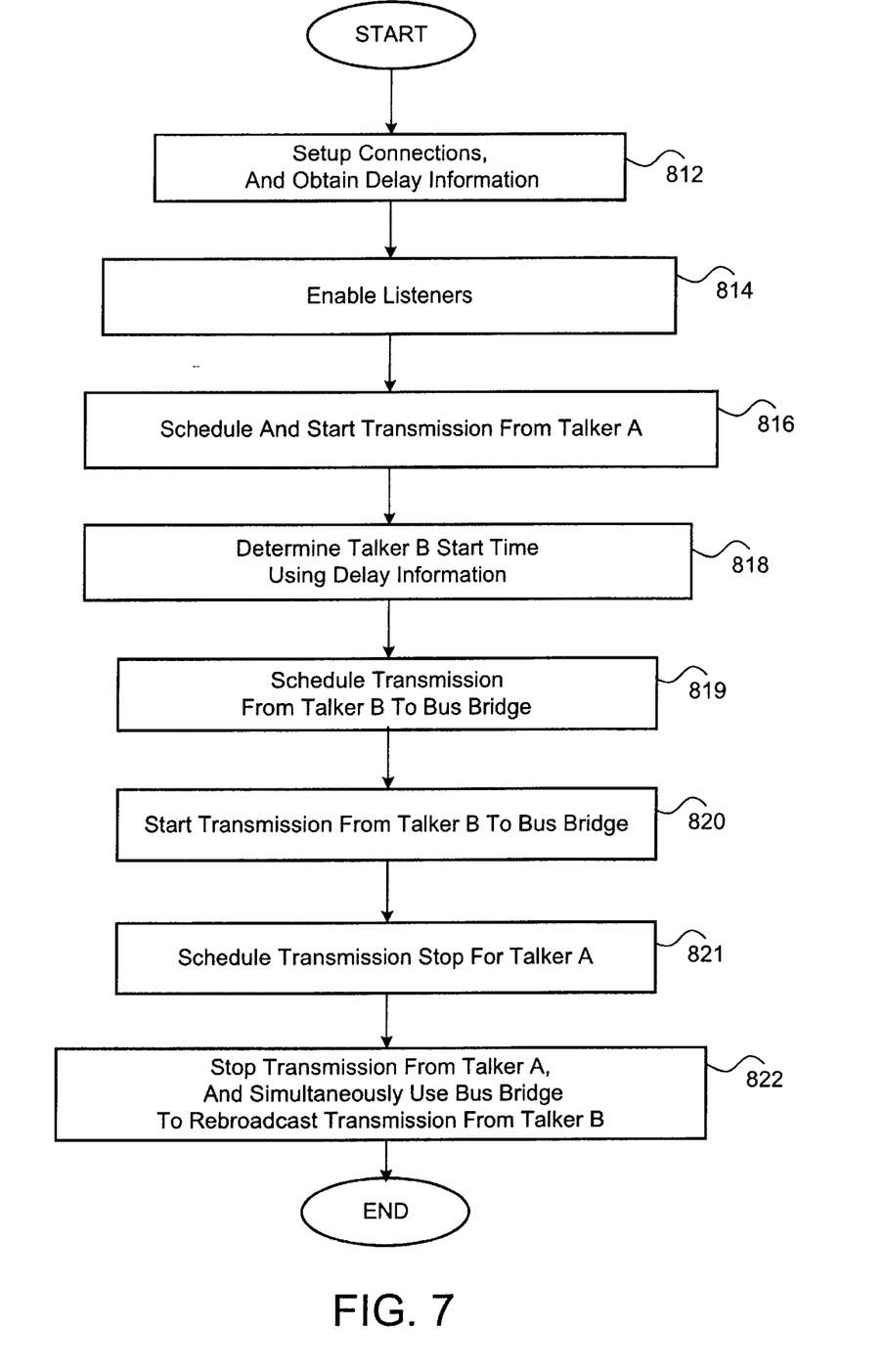
FIG. 7 is a flowchart of method steps for performing a transition from a talker A to a talker B, in accordance with one embodiment of the present invention.

Referring now to FIG. 7, a flowchart of method steps for performing a transition from a talker A 512 to a talker B 520 is shown, in accordance with one embodiment of the present invention. In alternate embodiments, the present invention may be successfully implemented with method steps that follow an altered sequence, or include steps that are different from, or in addition to, those discussed in conjunction with the FIG. 7 embodiment.

In the FIG. 7 embodiment, initially, in step 812, a controller 118 preferably utilizes a connection manager 314 to set up connections and obtain delay information for a particular isochronous data transmission that includes a transition from a talker A 512 to a talker B 520. In the FIG. 7 embodiment, in step 814, controller 118 then preferably uses a listener module 318 to enable a listener A 516 and a listener B 524 to receive the data transmission.

In step 816, controller 118 next preferably utilizes a talker module 316 to schedule a transmission A from talker A 512. In response, talker A 512 begins the transmission A at the scheduled start time. Then, in step 818, talker module 316 preferably utilizes the delay information obtained by connection manager 314 in foregoing step 812 to determine a "pre-roll" start time for talker B 520 to begin transmitting a transmission B to bus A 114 through bus bridge 116.

In step 819, talker module 316 then preferably schedules talker B 520 to begin transmitting the transmission B at the "pre-roll" start time. In response, in step 820, talker B 520 begins sending transmission B to bus A 114 through bus bridge 116 at the scheduled start time. In step 821, talker module 316 preferably schedules a stop time for talker A 512 to stop broadcasting transmission A.

Finally, in step 822, precisely at a designated rebroadcast time, bus bridge 116 preferably begins to rebroadcast the transmission B received from talker B 520. In the FIG. 7 embodiment, also at the rebroadcast time, talker A 512 stops broadcasting transmission A to successfully complete a seamless and synchronized transition from transmission A of talker A 512 to transmission B of talker B 520.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for providing a continuous transmission stream in an electronic interconnect, comprising:
   a first talker coupled to a first bus in said electronic interconnect for initially broadcasting a first transmission to one or more listeners;
   a second talker coupled to a second bus in said electronic interconnect through a delay element for subsequently broadcasting a second transmission to said one or more listeners; and
   a controller coupled to said electronic interconnect for routing said first transmission and second transmission to compensate for said delay element and thereby form said continuous transmission stream.

2. The system of claim 1 wherein said electronic interconnect is implemented according to an IEEE Std 1394 serial bus interconnectivity standard.

3. The system of claim 1 wherein said continuous transmission stream includes isochronous data traffic on said electronic interconnect.

4. The system of claim 1 wherein any of said controller, said first talker, said second talker, and said one or more listeners is one of a consumer-electronics device, an audio-visual device, a set-top box device, and a personal computer device.

5. The system of claim 1 wherein said controller schedules said second talker to transmit said second transmission through said delay element to said first talker with a pre-roll start time which ensures that said second transmission arrives at said first talker precisely when said first transmission terminates, said controller then simultaneously rebroadcasting said second transmission to said one or more listeners to provide said continuous transmission stream.

6. A system for providing a continuous transmission stream in an electronic interconnect, comprising:
   a first talker coupled to said electronic interconnect for initially broadcasting a first transmission to one or more listeners;
   a second talker coupled to said electronic interconnect through a delay element for subsequently broadcasting a second transmission to said one or more listeners, said delay element including a bus bridge device that couples a first bus to a second bus in said electronic interconnect; and
   a controller coupled to said electronic interconnect for routing said first transmission and second transmission to compensate for said delay element and thereby form said continuous transmission stream.

7. A system for providing a continuous transmission stream in an electronic interconnect, comprising:
   a first talker coupled to said electronic interconnect for initially broadcasting a first transmission to one or more listeners;
   a second talker coupled to said electronic interconnect through a delay element for subsequently broadcasting a second transmission to said one or more listeners, said electronic interconnect including a first bus coupled to a second bus through a bus bridge, said first talker and a first listener being on said first bus, and said second talker and a second listener being on said second bus; and
   a controller coupled to said electronic interconnect for routing said first transmission and second transmission to compensate for said delay element and thereby form said continuous transmission stream.

8. The system of claim 7 wherein said bus bridge permits communications between said first bus and said second bus, said bus bridge adding a propagation delay to said bi-directional communications.

9. The system of claim 8 wherein a connection manager of said controller initially sets up connections for said first transmission and said second transmission.

10. The system of claim 9 wherein said connection manager determines said propagation delay of said bi-directional communications.

11. The system of claim 10 wherein a listener module of said controller enables said first listener and said second listener to receive said continuous transmission stream.

12. The system of claim 11 wherein a talker module of said controller schedules a first start time for said first talker to begin said first transmission.

13. The system of claim 12 wherein said first talker begins said first transmission at said first start time.

14. The system of claim 13 wherein said talker module uses said propagation delay to calculate a pre-roll start time for said second talker to begin said second transmission.

15. The system of claim 14 wherein said talker module schedules said second talker to begin said second transmission at said pre-roll start time.

16. The system of claim 15 wherein said second talker begins to propagate said second transmission to said first bus at said pre-roll start time.

17. The system of claim 16 wherein said talker module schedules a first stop time for said first talker to terminate said first transmission.

18. The system of claim 17 wherein said first talker stops said first transmission at said first stop time.

19. The system of claim 18 wherein said second transmission passes through said bus bridge to said first bus, and wherein said bus bridge then begins rebroadcasting said second transmission towards said second bus precisely at said first stop time when said first talker terminates said first transmission to thereby provide said continuous transmission stream.

20. The system of claim 19 wherein said electronic interconnect includes one or more additional busses and one or more additional talkers, said controller routing one or more additional transmissions to compensate for one or more additional delay elements to thereby form said continuous transmission stream.

21. A method for providing a continuous transmission stream in an electronic interconnect, comprising the steps of:
broadcasting a first transmission to one or more listeners using a first talker coupled to a first bus in said electronic interconnect;
broadcasting a second transmission to said one or more listeners using a second talker coupled to a second bus in said electronic interconnect through a delay element; and
routing said first transmission and second transmission with a controller to compensate for said delay element and thereby form said continuous transmission stream.

22. The method of claim 21 wherein said electronic interconnect is implemented according to an IEEE Std 1394 serial bus interconnectivity standard.

23. The method of claim 21 wherein said continuous transmission stream includes isochronous data traffic on said electronic interconnect.

24. The method of claim 21 wherein any of said controller, said first talker, said second talker, and said one or more listeners is one of a consumer-electronics device, an audio-visual device, a set-top box device, and a personal computer device.

25. The method of claim 21 wherein said controller schedules said second talker to transmit said second transmission through said delay element to said first talker with a pre-roll start time which ensures that said second transmission arrives at said first talker precisely when said first transmission terminates, said controller then simultaneously rebroadcasting said second transmission to said one or more listeners to provide said continuous transmission stream.

26. A method for providing a continuous transmission stream in an electronic interconnect, comprising the steps of:
broadcasting a first transmission to one or more listeners using a first talker;
broadcasting a second transmission to said one or more listeners using a second talker coupled to said electronic interconnect through a delay element, said delay element including a bus bridge device that couples a first bus to a second bus in said electronic interconnect; and
routing said first transmission and second transmission with a controller to compensate for said delay element and thereby form said continuous transmission stream.

27. A method for providing a continuous transmission stream in an electronic interconnect, comprising the steps of:
broadcasting a first transmission to one or more listeners using a first talker;
broadcasting a second transmission to said one or more listeners using a second talker coupled to said electronic interconnect through a delay element, said electronic interconnect including a first bus coupled to a second bus through a bus bridge, said first talker and a first listener being on said first bus, and said second talker and a second listener being on said second bus; and
routing said first transmission and second transmission with a controller to compensate for said delay element and thereby form said continuous transmission stream.

28. The method of claim 27 wherein said bus bridge permits bi-directional communications between said first bus and said second bus, said bus bridge adding a propagation delay to said bi-directional communications.

29. The method of claim 28 wherein a connection manager of said controller initially sets up connections for said first transmission and said second transmission.

30. The method of claim 29 wherein said connection manager determines said propagation delay of said bi-directional communications.

31. The method of claim 30 wherein a listener module of said controller enables said first listener and said second listener to receive said continuous transmission stream.

32. The method of claim 31 wherein a talker module of said controller schedules a first start time for said first talker to begin said first transmission.

33. The method of claim 32 wherein said first talker begins said first transmission at said first start time.

34. The method of claim 33 wherein said talker module uses said propagation delay to calculate a pre-roll start time for said second talker to begin said second transmission.

35. The method of claim 34 wherein said talker module schedules said second talker to begin said second transmission at said pre-roll start time.

36. The method of claim 35 wherein said second talker begins to propagate said second transmission to said first bus at said pre-roll start time.

37. The method of claim 36 wherein said talker module schedules a first stop time for said first talker to terminate said first transmission.

38. The method of claim 37 wherein said first talker stops said first transmission at said first stop time.

39. The method of claim 38 wherein said second transmission passes through said bus bridge to said first bus, and wherein said bus bridge then begins rebroadcasting said second transmission towards said second bus precisely at said first stop time when said first talker terminates said first transmission to thereby provide said continuous transmission stream.

40. The method of claim 38 wherein said second transmission passes through said bus bridge to said first talker, and wherein said first talker then begins rebroadcasting said second transmission towards said second bus precisely at said first stop time when said first talker terminates said first transmission to thereby provide said continuous transmission stream.

41. The method of claim 38 wherein said second transmission passes through said bus bridge to said first bus, and wherein a transmission device then begins rebroadcasting said second transmission towards said second bus precisely at said first stop time when said first talker terminates said first transmission to thereby provide said continuous transmission stream.

42. The method of claim 39 wherein said electronic interconnect includes one or more additional busses and one or more additional talkers, said controller routing one or more additional transmissions to compensate for one or more additional delay elements to thereby form said continuous transmission stream.

43. A computer-readable medium containing program instructions for providing a continuous transmission stream by performing the steps of:

broadcasting a first transmission to one or more listeners using a first talker coupled to a first bus in said electronic interconnect;

broadcasting a second transmission to said one or more listeners using a second talker coupled to a second bus in said electronic interconnect through a delay element; and routing said first transmission and second transmission with a controller to compensate for said delay element and thereby form said continuous transmission stream.

* * * * *